US012618997B2

(12) United States Patent 
Yang

(10) Patent No.: US 12,618,997 B2 
(45) Date of Patent: May 5, 2026

(54) REDUCING EFFECT OF MOTION ON NMR MEASUREMENTS

(71) Applicant: Halliburton Energy Services, Inc., Houston, TX (US)

(72) Inventor: Jie Yang, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 384 days.

(21) Appl. No.: 18/205,657

(22) Filed: Jun. 5, 2023

(65) Prior Publication Data

US 2024/0402379 A1 Dec. 5, 2024

(51) Int. Cl.
| | |
|---|---|
| *G01V 3/38* | (2006.01) |
| *E21B 49/00* | (2006.01) |
| *G01V 3/32* | (2006.01) |
| *G06F 17/18* | (2006.01) |

(52) U.S. Cl.
CPC ................ *G01V 3/38* (2013.01); *E21B 49/00* (2013.01); *G01V 3/32* (2013.01); *G06F 17/18* (2013.01); *E21B 2200/20* (2020.05)

(58) Field of Classification Search
CPC ....... E21B 49/00; E21B 2200/20; G01V 3/32; G01V 3/38; G06F 17/18
See application file for complete search history.

(56) References Cited

U.S. PATENT DOCUMENTS

| | | | | | |
|---|---|---|---|---|---|
| 7,196,516 | B2 * | 3/2007 | Blanz | ........................ | G01V 3/32 324/303 |
| 10,168,444 | B2 * | 1/2019 | Jachmann | ................ | G01V 3/32 |
| 10,429,536 | B2 * | 10/2019 | Kischkat | .......... | G01R 33/56509 |
| 11,060,398 | B2 * | 7/2021 | Butler | ...................... | E21B 47/13 |
| 11,828,900 | B2 * | 11/2023 | Tang | ...................... | G06Q 50/02 |
| 2016/0018555 | A1 | 1/2016 | Jachmann et al. | | |
| 2017/0205527 | A1 | 7/2017 | Coman | | |
| 2019/0271224 | A1 | 9/2019 | Utsuzawa et al. | | |
| 2021/0270990 | A1 | 9/2021 | Yang et al. | | |
| 2022/0187489 | A1 | 6/2022 | Yang et al. | | |
| 2022/0356800 | A1 | 11/2022 | Yang et al. | | |

OTHER PUBLICATIONS

International Search Report & Written Opinion; PCT/US2023/024538; mailed Feb. 23, 2024.

* cited by examiner

*Primary Examiner* — Justin R Knapp
(74) *Attorney, Agent, or Firm* — NOVAK DRUCE CARROLL LLP

(57) ABSTRACT

Systems and methods of removing motion-induced noise from datasets from a NMR tool. The method includes steps of generating an echo train from each dataset and identifying one or more datasets that were collected while a motion of the tool was below a predetermined threshold as stationary datasets. Datasets not identified as stationary are identified as moving datasets. The method further performs steps of building a statistical model of the echo train, estimating a motion-induced noise component of the echo train using the statistical model and the stationary datasets, calculating a distortion of the echo train for each datasets using a physical model of the tool within the wellbore, estimating a true signal of each moving dataset based on the estimated motion-induced noise component and the respective calculated distortion, estimating a true signal of each stationary dataset based on the respective calculated distortion, and combining the estimated true signals of the moving datasets and the stationary datasets to produce a superset of clean NMR data.

15 Claims, 5 Drawing Sheets

400

500

REDUCING EFFECT OF MOTION ON NMR MEASUREMENTS

TECHNICAL FIELD

The present technology pertains to downhole sensing systems and, more particularly, to nuclear magnetic resonance (NMR) tools that emit and detect acoustic signals so as to characterize the substrate surrounding a wellbore.

BACKGROUND

Logging while drilling (LWD) is a technique of conveying well logging tools into the well borehole downhole as part of the bottom hole assembly (BHA). LWD refers to measurements concerning the geological formation made while drilling. Data and measurements can be transmitted to the surface, e.g., via a mud pulser, while the LWD tool is still in the borehole, referred to as "real-time data," or downloaded from the LWD tool after it is pulled out of hole, referred to as "memory data."

NMR technology has become a powerful tool for obtaining well-logging data. The method mainly relies on the Carr-Purcell-Meiboom-Gill (CPMG) sequence to measure the T2 decay signal and, by inverting the time-domain signal, to estimate porosity, permeability, pore size distribution, and movable fluid saturation of a formation at various depths.

Sensor data usually includes noise induced by motion of the tool while making measurements. Typically, a simple physical model is used to compensate for the motion effect. When the sensor signal is on the same order of magnitude as the motion-induced noise, as is common in NMR tools, a simple physical model does not accurately handle the actual motion dynamics.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
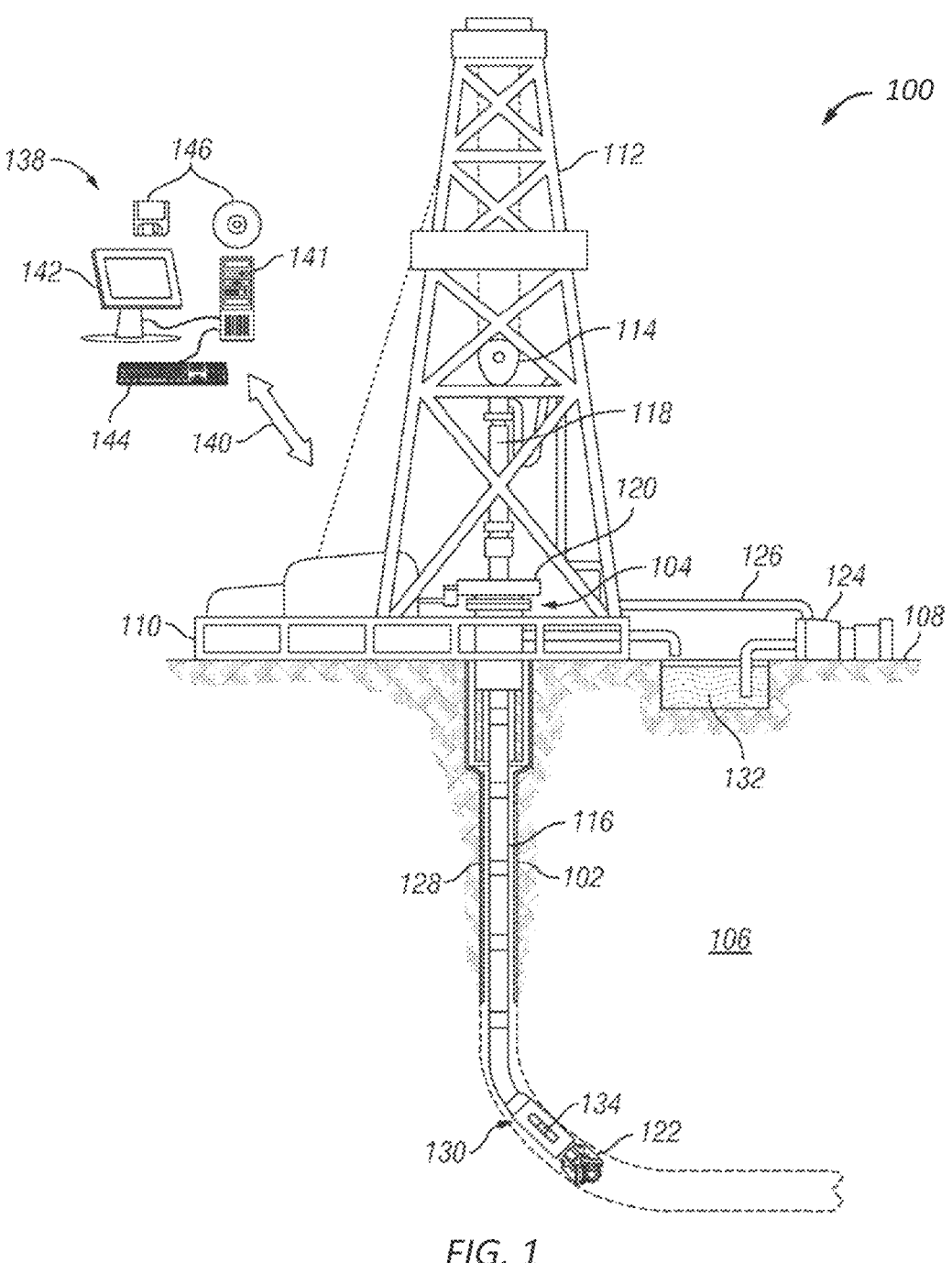
FIG. 1 illustrates an example of a well system, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

One method used to analyze the structure and composition of the subterranean substrate in which a wellbore has been drilled is to lower an NMR tool into the wellbore while drilling. The NMR data usually includes noise on the same order of magnitude as the signal, wherein the noise can be decomposed into motion-independent noise (white noise) and noise (or signal distortion) created by motion of the tool while making measurements. Typically, a simple physical model is used to compensate for the motion effect. A simple model, however, is not usually sufficient to remove the motion-related noise. The systems and methods disclosed herein improve this issue.

The disclosed system improves the noise removal by combining a physical model with a statistical model to make an improved estimate of the motion-induced noise. NMR measurements made while a drill pipe is being added or removed are classified as "stationary" or "quasi-stationary" since the drill pipe is axially moving very slowly, i.e., at a speed at or below a threshold velocity, during the coupling/decoupling operation. A statistical model is created with this stationary data as well as the non-stationary datasets, referred to as "moving" datasets, to estimate the motion-induced noise in the moving datasets. Use of this model with all of the recorded data produces an improves estimate of the motion-induced noise that can be utilized to assess and/or correct other measurements taken while the tool is moving and therefore improve the data collected while the tool is in motion.

Data may include, but is not limited to, T1 and/or T2 distributions, T1 and/or T2 porosities of a subterranean formation, NMR permeability, ratio, and/or various T1 and/or T2 quality control (QC) curves for the case of NMR acquired data.

FIG. 1 illustrates a drilling system 100 in accordance with example embodiments. As illustrated, borehole 102 may extend from a wellhead 104 into a subterranean formation

106 from a surface 108. Generally, borehole 102 may include horizontal, vertical, slanted, curved, and other types of borehole geometries and orientations. Borehole 102 may be cased or uncased. In examples, borehole 102 may include a metallic member. By way of example, the metallic member may be a casing, liner, tubing, or other elongated steel tubular disposed in borehole 102.

As illustrated in FIG. 1, borehole 102 may extend generally vertically into the subterranean formation 106, however borehole 102 may extend at an angle through subterranean formation 106, including horizontal and slanted portions of the borehole 102. For example, although FIG. 1 illustrates a vertical or low inclination angle well, high inclination angle or horizontal placement of the well and equipment may be possible. It should further be noted that while FIG. 1 generally depicts land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A drill bit 122 may be attached to the distal end of drill string 116 and may be driven either by a downhole motor and/or via rotation of drill string 116 from surface 108. Without limitation, drill bit 122 may include roller cone bits, PDC bits, natural diamond bits, any hole openers, reamers, coring bits, and the like. As drill bit 122 rotates, it may create and extend borehole 102 that penetrates various subterranean formations 106. A pump 124 may circulate drilling fluid through a feed pipe 126 through kelly 118, downhole through interior of drill string 116, through orifices in drill bit 122, back to surface 108 via annulus 128 surrounding drill string 116, and into a retention pit 132.

Drill string 116 may begin at wellhead 104 and traverse borehole 102. Drill bit 122 may be attached to a distal end of drill string 116 and may be driven, for example, either by a downhole motor and/or via rotation of drill string 116 from surface 108. Drill bit 122 may be a part of bottom hole assembly (BHA) 130 at distal end of drill string 116. BHA 130 may further include tools for look-ahead resistivity applications. As will be appreciated by those of ordinary skill in the art, BHA 130 may be a measurement-while-drilling (MWD) or logging-while-drilling (LWD) system.

BHA 130 may comprise any number of tools, transmitters, and/or receivers to perform downhole measurement operations. For example, as illustrated in FIG. 1, BHA 130 may include a borehole logging tool 134. In certain embodiments, the borehole logging tool 134 is a sonic tool. In certain embodiments, the borehole logging tool 134 is an NMR tool. Without limitation, any number of different measurement assemblies, communication assemblies, battery assemblies, and/or the like may form BHA 130 with borehole logging tool 134. Additionally, borehole logging tool 134 may form the BHA 130 itself.

Borehole logging tool 134 may be any suitable tool for taking measurements of borehole 102 or subterranean formation 106. For example, borehole logging tool 134 may be but is not limited to, an NMR tool, imaging tool, resistivity measurement tool, acoustic tool, neutron measurement-based tool, density measurement-based tool, and/or pulsed neutron measurement-based tool.

In examples, there may be any suitable number of, and type of sensors disposed on borehole logging tool 134. Each sensor may be controlled by information handling system 138. Information and/or measurements may be processed further by information handling system 138 to determine properties of borehole 102, fluids, and/or subterranean formation 106.

Without limitation, BHA 130 may be connected to and/or controlled by information handling system 138, which may be disposed on surface 108. Without limitation, information handling system 138 may be disposed downhole in BHA 130. Processing of information recorded may occur downhole and/or on surface 108. Processing occurring downhole may be transmitted to surface 108 to be recorded, observed, and/or further analyzed. Additionally, information recorded on information handling system 138 that may be disposed downhole may be stored until BHA 130 may be brought to surface 108. In examples, information handling system 138 may communicate with BHA 130 through a communication line (not illustrated) disposed in (or on) drill string 116. In examples, wireless communication may be used to transmit information back and forth between information handling system 138 and BHA 130. Information handling system 138 may transmit information to BHA 130 and may receive as well as process information recorded by BHA 130. In examples, a downhole information handling system (not illustrated) may include, without limitation, a microprocessor or other suitable circuitry, for estimating, receiving and processing signals from BHA 130. Downhole information handling system (not illustrated) may further include additional components, such as memory, input/output devices, interfaces, and the like. In examples, while not illustrated, BHA 130 may include one or more additional components, such as analog-to-digital converter, filter and amplifier, among others, that may be used to process the measurements of BHA 130 before they may be transmitted to surface 108. Alternatively, raw measurements from BHA 130 may be transmitted to surface 108.

Any suitable technique may be used for transmitting signals from BHA 130 to surface 108, including, but not limited to, wired pipe telemetry, mud-pulse telemetry, acoustic telemetry, and electromagnetic telemetry. While not illustrated, BHA 130 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 140, which may be a wired or wireless link. The telemetry data may be analyzed and processed by information handling system 138.

As illustrated, communication link 140 (which may be wired or wireless, for example) may be provided that may transmit data from BHA 130 to an information handling system 138 at surface 108. Information handling system 138 may include a personal computer 141, a video display 142, a keyboard 144 (i.e., other input devices.\), and/or non-transitory computer-readable media 146 (e.g., optical disks, magnetic disks) that can store code representative of the methods described herein. In addition to, or in place of processing at surface 108, processing may occur downhole. Information handling system 138 may process measurements taken by borehole logging tool 134.

Discussed below are methods for processing measurements recorded during drilling operations to improve measurement data quality. As disclosed below, proposed algorithms may be implemented in a post-acquisition processing software and post-acquisition processing software or in-situ software may be implemented on learning systems. Learning systems may include but are not limited to any type of Neural Networks (NN), Artificial intelligence (AI), and/or machine learning that may utilize databases and software training methods. In certain embodiments, software training includes one or more algorithms utilized to find an answer product.

Algorithms may be utilized with or without machine learning to select measurement data from borehole logging tool 134 during a "pipe break" that may also referred to as a "unique station," which is used herein to refer to pausing of vertical motion in sensing or drilling operations. As used within this document, the terms "stationary" and "quasi-stationary" are used interchangeably to refer to the degree of vertical motion. Unless explicitly stated otherwise, a tool 134 is stationary during a pipe break and a dataset collected from a unique station is taken while the tool 134 is stationary.

In certain embodiments, a pipe break includes one or more of suspending the drill string 116 "in slips" on the rig floor, turning off the circulating mud pump, and detaching the kelly and/or drill string 116 above the platform 110. During drilling or "tripping" operations, a new section of drill pipe and/or the kelly 118 is reattached to the suspended drill string 116, circulating pump 124 is turned back on, and then the drilling assembly lifted "out of slips," and operations may recommence. For a "trip out" operation, drill pipe is stacked in rig 112 or laid down before lowering the block 114 and lifting the next section of drill pipe to be removed.

Pipe breaks may further be identified as unique stations for acquiring data downhole. For example, data may continue to be collected by a logging tool disposed on BHA 130 at these unique stations. This data may be free of noise and other issues associated with taking measurements in a downhole environment during drilling operations. The measurements taken may be referred to as non-motion measurements. It should be noted, conventionally, measurements are not taken at these unique stations because the drilling operation has been shut down. A shut-down drilling operation prevents the generation of electricity at BHA 130 through turbines and other similar methods. In certain embodiments, however, BHA 130 includes one or more batteries that power borehole logging tool 134. This allows borehole logging tool 134 to continue to operate at these unique stations during pipe breaks. Conventional technology does not include batteries in borehole logging tool 134 as they take up space inside BHA 130. During post processing, pipe breaks may be identified by viewing depth change of borehole logging tool 134 (e.g., referring to FIG. 2) with respect to time, which may be denoted as "depth (t)."

However, measurements taken with borehole logging tool 134 may include noise and/or accuracy of measurements such as depth of borehole logging tool 134, type of measurement, and/or time. In certain situations, a data point that matches Equation (1) may not correspond to a pipe break, i.e., appear as a pseudo pipe break. For example, borehole logging tool 134 may get stuck or stop moving for any number of reasons in borehole 102 (referring to FIG. 1). In certain embodiments, the algorithm is able to filter out depth measurements, noise, and pseudo pipe breaks. This may be done by utilizing multi-sensor data in borehole logging tool 134, e.g., a magnetometer, a gyro and an accelerometer together with a depth measurement taken by borehole logging tool 134. During post-processing of in-situ processing, with or without machine learning, additional mathematical filters and software training may be applied. An example of a filter and software training is the use of a sum of absolute depth derivative.

During data processing, "stations" are identified in measurements, which are used to improve measurement data. For this disclosure, an individual "station" is defined as a minimal set of contiguous events where the depth does not change significantly. For example, the algorithm may perform a "depth difference" operation to find all locations within borehole 102 in which borehole logging tool 134 (e.g., referring to FIG. 1) recorded a depth difference vector measurement at 0. During processing operations, some locations with the depth difference vector measurement at 0 are removed. This is because the measurements at 0 do not meet a minimal number of contiguous events. Each of the resulting locations would be considered a "station." In examples, locations where the depth difference vector is a very small non-zero value may also be considered a station. As discussed above, the post-processing or in-situ processing may be performed by machine learning instead of the 0 or small depth difference value and minimum number of contiguous events.

To help identify depth difference vector measurements at 0, multiple sensor data may be used, for example depth measurements, accelerometer measurements, rotational speed measurements, and/or the like taken with borehole logging tool 134 (referring to FIG. 1). Additionally, statistical models may be used to identify stations during processing. For example, during processing a nominal time T is calculated by looking at distribution of absolute depth derivative, rotational speed distribution, and accelerometer at zero (or close to zero). Then, moving integration of above sensor data with nominal time frame is used to find stations. This is performed by identifying integration values that are less or equal to a small value delta that is computed by using a suitable statistical mode to produce a certain confidence level as a threshold. For example, the threshold may be example 95%.

In certain embodiments, the information handling system 138, referring to FIG. 1, automatically selects, extracts, and processes stationary data events with minimal input parameter criteria. As discussed above, machine learning may be implemented (using one or more information handling system 138) to use multi-sensor data, for example, to perform mathematical operations such as regression with cross validation, which may be used to find time intervals and depths for stations, and corresponding parameters. Other methods may utilize invention algorithms to extract data during a data load step and process the resulting data with other mathematical operations such as Echo Stacking, Echo Phase Rotation, Depth Binning, Merging, and Inversion at each station individually for the case of NMR acquired data.

In certain embodiments, information handling system 138 automatically identifies pipe break time intervals as unique stations. Unique set stations are extracted from acquired data where all activities are considered along with depth differences equal to zero which may occur during pipe breaks, along with a user selectable nominal time spent while "stationary." Users will also have the option to set a delta depth parameter with information handling system 138, which may also be used to train machine learning, to a small non-zero value when considering non-zero depth differences. The delta depth parameter is a parameter set by the user prior to performing quasi-station data extraction algorithm during the load data step. For example, the load data step may include echo loading, where identified stationary data may be used to estimate noise level. Noise level may be influenced by mud and formation (loading effect), and therefore corresponding parameters may be estimated in inversion by information handling system 138 or the utilization of machine learning.

Results from the processing may be compared to standard LWD log results. For example, stationary data (discussed above) may be compared with data at the same depth from same tool with motion or result from other tools. Additionally, pipe break stationary data and corresponding standard LWD data may be processed together to improve standard LWD log quality. Information handling system 138, with or without machine learning, may also perform QC processing for pipe break data and corresponding drilling data. QC processing may be performed by taking stationary data and comparing it with non-stationary data, either from borehole logging tool 134 or other tools. Data after QC processing may be close to the same depth measurements when hardware and data processing is working properly. QC processing may also utilize measurements from trip in, trip out, and circulating activities in addition to drilling activities for QC in regard to data measurements.

As discussed above, data measurements are processed using an algorithm that is performed by a processor of information handling system 138 or equivalent system, for example a NN machine learning system.

Figure 2:
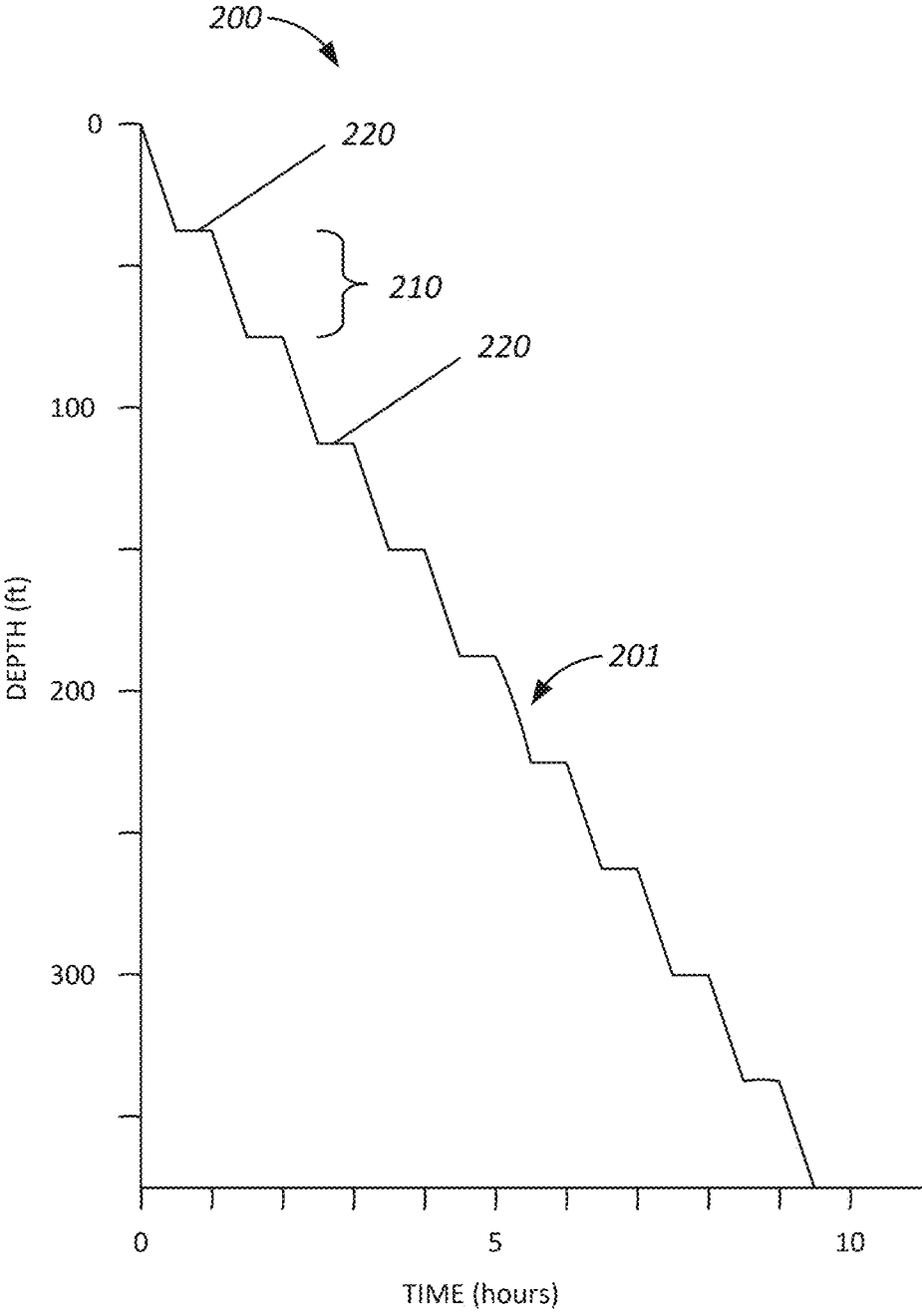
FIG. 2 illustrates an example of movement of a tool down a borehole, in accordance with various aspects of the subject technology.

FIG. 2 is a plot 200 of an example of movement of a tool down a borehole, for example borehole logging tool 134 in borehole 102 of FIG. 1, in accordance with various aspects of the subject technology. The curve 201 represents the depth of the tool 134 vs chronological time. In this example, the tool 134 starts at the surface 108, i.e., zero depth, and is lowered at rate of approximately 80 feet per minute (fpm) into the borehole 102. At certain depth intervals, for example when a new drill pipe must be attached to drill string 116, the tool 134 is temporarily approximately vertically stationary, as indicated by the horizontal portion 220 of curve 201. Each moving portion of curve 201, e.g., the portion 210, indicates that the tool 134 is moving vertically. The portions 220 are one example of a pipe break.

In certain embodiments, the borehole logging tool 134 is a NMR logging tool. In certain embodiments, the NMR tool is lowered to the bottom of a region of interest and subsequently pulled upward (e.g., at a substantially constant speed) through the region of interest. In certain implementations, an NMR logging tool collects data while drill string 116 is moving. An NMR logging tool may also collect data at stationary points in wellbore 110.

In certain embodiments, determination of whether a dataset is collected while the tool is stationary is based on a parameter included in the respective dataset. In certain embodiments, the determination of whether a dataset is collected while the tool is stationary is based on a depth parameter and a second record of the drill string motion; e.g., an association of the depth of the tool which the drill string stopped. In certain embodiments, the determination of whether a dataset is collected while the tool is stationary is based on a time parameter included in the respective dataset and a second record of the drill string motion; e.g., including times at which the drill string was stopped.

Figure 3:
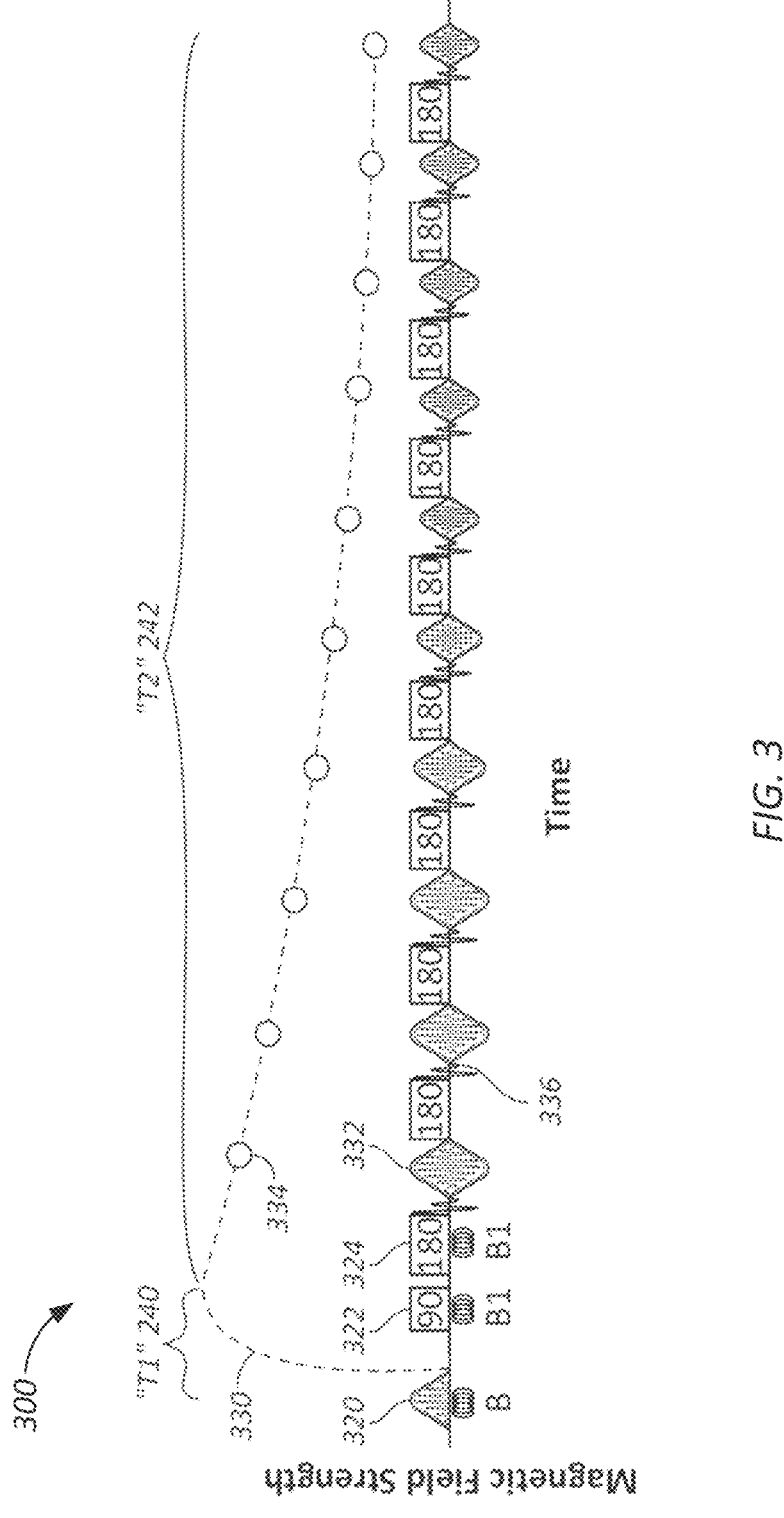
FIG. 3 is a plot of an example NMR echo train, in accordance with various aspects of the subject technology.

FIG. 3 is a plot 300 of an example NMR echo train 330, in accordance with various aspects of the subject technology.

NMR logging tool 134, from FIG. 1, may obtain NMR signals by polarizing nuclear spins in formation 106 and pulsing the nuclei with a radio frequency (RF) magnetic field. A first static magnetic field 320, commonly referred to as the "B" field, is applied. The bulk effect of nuclear magnetic spin alignment is called "the magnetization." Two specific manipulations are then commonly used in NMR downhole measurements. The first manipulation is a time-varying magnetic field in the plane perpendicular to the static field plane. The time-varying magnetic field is turned on and off at different increments to create a pulse. The first manipulation is commonly called a "90" pulse, shown in FIG. 3 as pulse 322. The second manipulation, commonly referred to as an "inversion" or a "180" pulse and shown in FIG. 3 as pulse 324, applies a time-varying magnetic field in the opposite direction from the 90 pulse 322. By adjusting the pulse length and/or and amplitude, the magnetization may be rotated any amount. Various pulse sequences (e.g., series of radio frequency pulses, delays, and other operations) may be used to obtain the NMR signals, including the Carr Purcell Meiboom Gill (CPMG) sequence reflected in FIG. 3.

The received data comprises two characteristics of the magnetization: longitudinal recovery (T1) and transverse relaxation (T2). The T2 parameter is influenced by the formation 106 and gradient of the tool 134. One method to obtain the T2 curve is to refocus the magnetization with a sequence of 180 pulses 324 and measure the echo free induction decay (FID) 332 produced by each 180 pulse 324. The "ringing" response 336 generated by each 180 pulse is ignored.

Each echo FID is integrated to give a single value 334 (called an echo), and a series of echoes 334 form an NMR echo train 330.

NMR echo trains are distorted due to tool motion during NMR measurement operations, such as LWD operations, which causes loss of information about formation 104.

Figure 4:
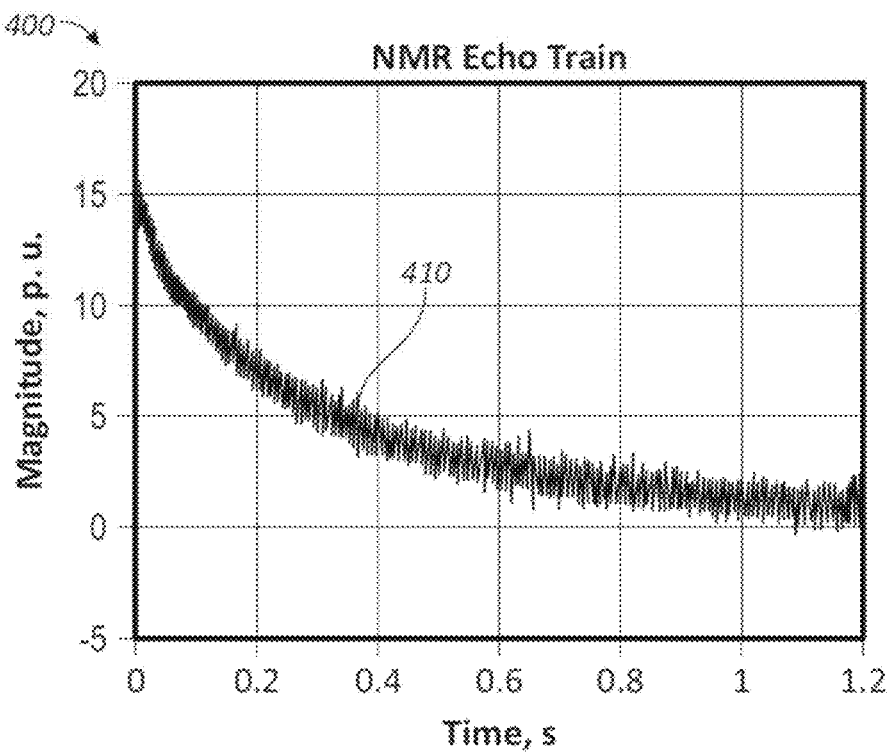
FIG. 4 is a plot of an example echo train received from an NMR tool, in accordance with various aspects of the subject technology.

FIG. 4 is a plot 400 of an example echo train 410 received from an NMR tool, in accordance with various aspects of the subject technology.

Figure 5:
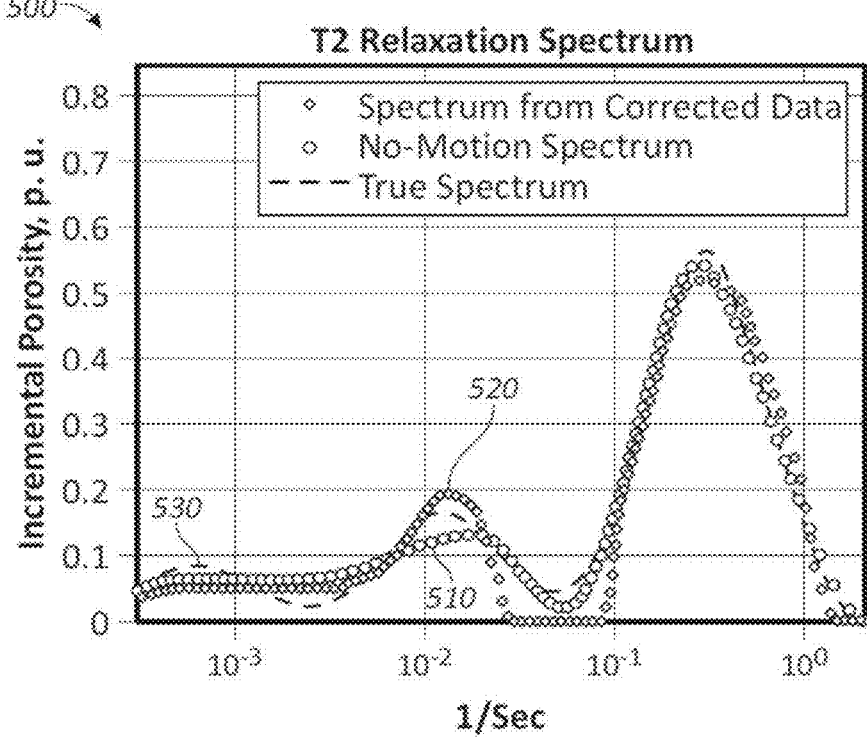
FIG. 5 is a plot of an example of spectra from stationary data and corrected moving data compared to the true underlying signal, in accordance with various aspects of the subject technology.

FIG. 5 is a plot 500 of an example of spectra from stationary data 510 and corrected moving data 520 compared to the true underlying signal 530, in accordance with various aspects of the subject technology.

Figure 6:
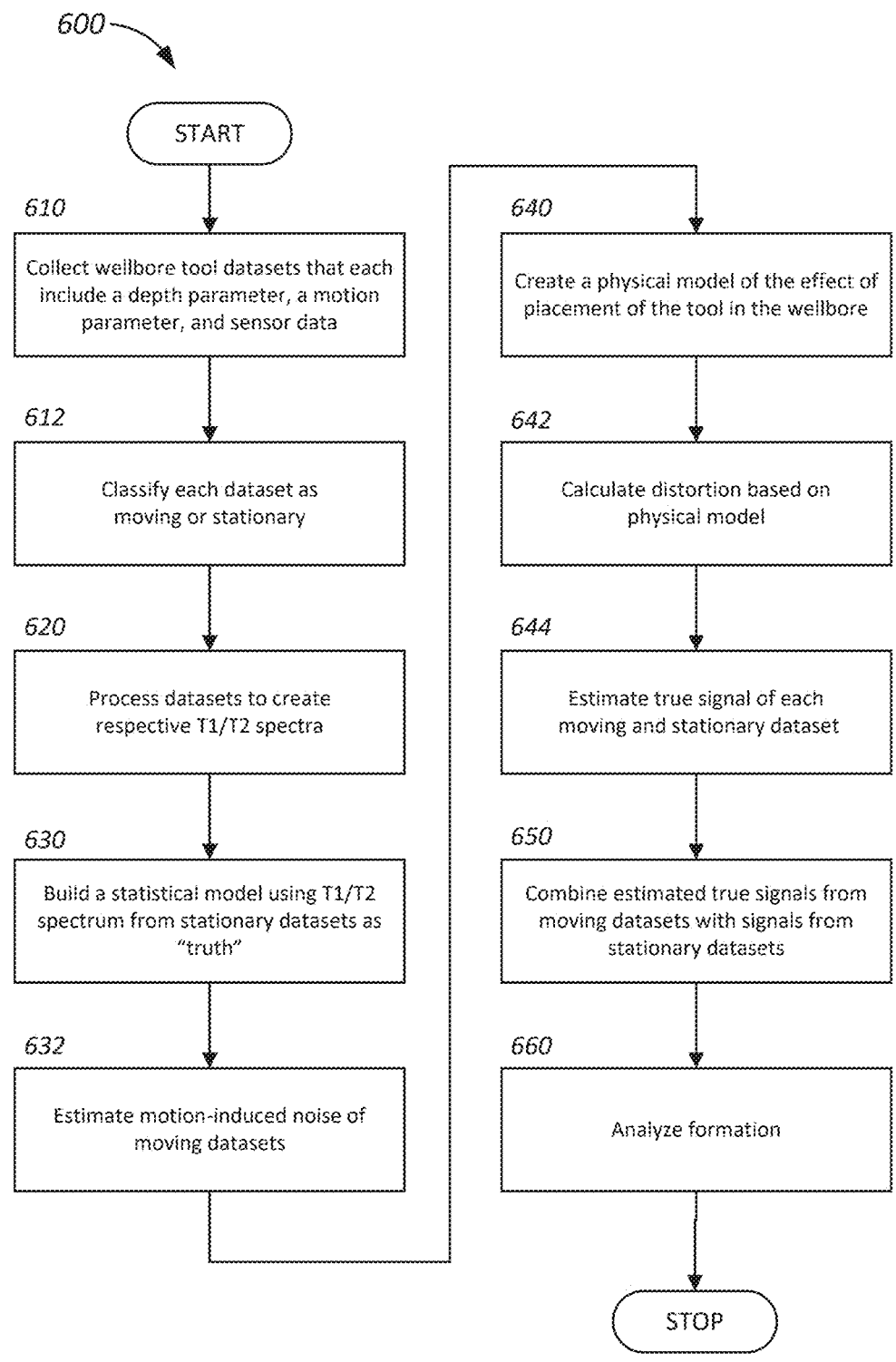
FIG. 6 is a flowchart of a method of removing noise from wellbore datasets, in accordance with various aspects of the subject technology.

FIG. 6 is a flowchart 600 of a method of removing noise from wellbore datasets, in accordance with various aspects of the subject technology.

The method starts with step 610 wherein multiple NMR datasets are collected from various depths, both while the drill string 116, with reference to FIG. 1, is moving and while the drill string 116 is stationary, e.g., during a pipe break. In certain embodiments, a dataset comprises one or more of a depth parameter, e.g., a pressure measurement, a motion parameter, e.g., an accelerometer measurement, and NMR data. The datasets are examined, e.g., by information handling system 138 of FIG. 1, in step 612 to classify each dataset as a "stationary" dataset, i.e., collected while the tool 143 was stationary, or as a "moving" data set. Step 620 processes each dataset to obtain a T1/T2 spectra, similar to curves 510, 520 as shown in FIG. 5, using methods known to those of skill in the art.

A statistical model is built in step 630. The T2 spectra from the stationary datasets are used as a representation of a "truth" result. An example model is:

$$Y_{static}(\text{depth}(i)) = \qquad\qquad (1)$$
$$\beta * (D(\text{depth}(i))) + \alpha * \text{correlation}(D(\text{depth}(i)), a_{lateral}) +$$
$$\gamma * \text{correlation}(D(\text{depth}(i)), a_{vertical}) + \text{noise}$$

where:

D (depth (i)) NMR dataset with motion at depth (i)

α, β, γ weighting parameters $a_{vertical}$ motion in z direction (along wellbore)

$a_{lateral}$ acceleration in x,y plane perpendicular to z direction noise white noise (motion-independent)

In certain embodiments, the lateral and/or the vertical correlations are developed based on one or both of the respective motion, i.e., velocity, and the acceleration of the tool.

Step 632 uses the model to estimate the motion-induced noise embedded in the moving datasets. In certain embodiments, a single estimate of the motion-induced noise is produced. In certain embodiments, the estimate of the motion-induced noise comprises a component that is associated with a parameter in the moving datasets, e.g., a scale factor based on a respective velocity of the moving datasets.

Step 640 creates a physical model of the tool 134 in wellbore 102 using a position parameter, e.g., a lateral displacement of tool 134 within the available open space of the wellbore 102, that determines the effect on the NMR signal from the offset of the tool from an ideal position in the wellbore 102 based on principles known to those of skill in the art. Step 642 uses the modeled physical motion to calculate the effect on the datasets due to physical displacement of the tool 134.

Step 644 estimates the true signal of each dataset by removing the motion-induced noise from raw signal of the moving datasets and compensating for the position-induced distortion in the raw signal both the moving and stationary datasets. In certain embodiments, the raw signal is the single T2 value derived from the respective echo train of each dataset. In certain embodiments, the raw signal is the T2 curve, e.g., the curve 242 of FIG. 3, derived from the respective echo train of each dataset.

Step 650 combines the estimated true signals from the moving datasets and the stationary datasets to create a superset of "clean" T2 values, covering a portion of the wellbore 102. The term "unfiltered" is used herein to data, whether raw NMR measurements or derived parameters, e.g., an echo value, that has not been manipulated or changed, e.g., to remove an estimated noise component. The term "clean" is used herein to refer to data, whether raw NMR measurements or derived parameters, e.g., an echo value, from which a motion-induced noise component has been removed. Step 660 analyzes the formation around wellbore 102 based on the clean superset of NMR data using method known to those of skill in the art.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

A1. A method of removing motion-induced noise, comprising: receiving a plurality of datasets from a nuclear magnetic resonance (NMR) tool, each dataset associated with a respective depth in a wellbore; generating an echo train from each dataset; identifying one or more datasets that were collected while a motion of the tool was below a predetermined threshold as stationary datasets, wherein datasets not identified as stationary are identified as moving datasets; building a statistical model of the echo train; estimating a motion-induced noise component of the echo train using the statistical model and the stationary datasets; calculating a distortion of the echo train for each datasets using a physical model of the tool within the wellbore; estimating a true signal of each moving dataset based on the estimated motion-induced noise component and the respective calculated distortion; estimating a true signal of each stationary dataset based on the respective calculated distortion; combining the estimated true signals of the moving datasets and the stationary datasets to produce a superset of clean NMR data.

A2. The method of A1, wherein: the dataset comprises one or more of a NMR magnetic field measurement, a depth parameter, and a motion parameter; and the step of identifying one or more stationary datasets comprises an evaluation of one or more of the depth parameter and the motion parameter.

A3. The method of A1, wherein the step of estimating the motion-induced noise component of the echo train is based in part on a comparison of a portion of the echo trains of the moving datasets to a portion of the echo trains of the stationary datasets.

A4. The method of A1, further comprising a step of analyzing a formation surrounding the wellbore based in part on the superset of clean NMR data.

A5. The method of A1, wherein the signal comprises a single T2 value derived from the respective echo train.

B6. A non-transitory computer-readable storage medium comprising instructions for removing motion-induced noise that, when loaded into a processor, cause the processor to execute steps of: receiving a plurality of datasets from a nuclear magnetic resonance (NMR) tool, each dataset associated with a respective depth in a wellbore; generating an echo train from each dataset; identifying one or more datasets that were collected while a motion of the tool was below a predetermined threshold as stationary datasets, wherein datasets not identified as stationary are identified as moving datasets; building a statistical model of the echo train; estimating a motion-induced noise component of the echo train using the statistical model and the stationary datasets; calculating a distortion of the echo train for each datasets using a physical model of the tool within the wellbore; estimating a true signal of each moving dataset based on the estimated motion-induced noise component and the respective calculated distortion; estimating a true signal of each stationary dataset based on the respective calculated distortion; and combining the estimated true signals of the moving datasets and the stationary datasets to produce a superset of clean NMR data.

B7. The memory of B6, wherein: the dataset comprises one or more of a NMR magnetic field measurement, a depth parameter, and a motion parameter; and the step of identifying one or more stationary datasets comprises an evaluation of one or more of the depth parameter and the motion parameter.

B8. The memory of B6, wherein the step of estimating the motion-induced noise component of the echo train is based in part on a comparison of a portion of the echo trains of the moving datasets to a portion of the echo trains of the stationary datasets.

B9. The memory of B6, further comprising a step of analyzing a formation surrounding the wellbore based in part on the superset of clean NMR data.

B10. The memory of B6, wherein the signal comprises a single T2 value derived from the respective echo train.

C11. A system for removing motion-induced noise, comprising a processor and a non-transitory computer-readable storage medium coupled to the processor and comprising instructions that, when loaded into the processor, cause the processor to execute steps of: receiving a plurality of datasets from a nuclear magnetic resonance (NMR) tool, each dataset associated with a respective depth in a wellbore; generating an echo train from each dataset; identifying one or more datasets that were collected while a motion of the tool was below a predetermined threshold as stationary datasets, wherein datasets not identified as stationary are identified as moving datasets; building a statistical model of the echo train; estimating a motion-induced noise component of the echo train using the statistical model and the stationary datasets; calculating a distortion of the echo train for each datasets using a physical model of the tool within the wellbore; estimating a true signal of each moving dataset based on the estimated motion-induced noise component and the respective calculated distortion; estimating a true signal of each stationary dataset based on the respective calculated distortion; combining the estimated true signals of the moving datasets and the stationary datasets to produce a superset of clean NMR data.

C12. The system of C11, wherein: the dataset comprises one or more of a NMR magnetic field measurement, a depth parameter, and a motion parameter; and the step of identifying one or more stationary datasets comprises an evaluation of one or more of the depth parameter and the motion parameter.

13. The system of C11, wherein the step of estimating the motion-induced noise component of the echo train is based in part on a comparison of a portion of the echo trains of the moving datasets to a portion of the echo trains of the stationary datasets.

14. The system of C11, further comprising a step of analyzing a formation surrounding the wellbore based in part on the superset of clean NMR data.

15. The system of C11, wherein the signal comprises a single T2 value derived from the respective echo train.

What is claimed is:

1. A method of removing motion-induced noise, comprising:
   operating a nuclear magnetic resonance (NMR) tool in a wellbore to obtain a plurality of datasets, each dataset associated with a respective depth in the wellbore;
   generating corresponding echo trains from each dataset;
   identifying one or more datasets that were collected while a motion of the tool was below a predetermined threshold as stationary datasets, wherein datasets not identified as stationary are identified as moving datasets;
   building a statistical model of the echo trains based on the stationary datasets and the moving datasets;
   estimating a motion-induced noise component of the echo trains using the statistical model and the stationary datasets;
   calculating a distortion of the echo trains for each dataset of the plurality of datasets using a physical model of the tool within the wellbore;
   estimating a true signal of each moving dataset based on the estimated motion-induced noise component and the respective calculated distortion;
   estimating a true signal of each stationary dataset based on the respective calculated distortion; and
   combining the estimated true signals of the moving datasets and the stationary datasets to produce a superset of clean NMR data.

2. The method of claim 1, wherein:
   the datasets comprises one or more of a NMR magnetic field measurement, a depth parameter, and a motion parameter; and
   of identifying one or more stationary datasets comprises an evaluation of one or more of the depth parameter and the motion parameter.

3. The method of claim 1, wherein estimating the motion-induced noise component of the echo train is based in part on a comparison of a portion of the echo trains of the moving datasets to a portion of the echo trains of the stationary datasets.

4. The method of claim 1, further comprising a step of analyzing a formation surrounding the wellbore based in part on the superset of clean NMR data.

5. The method of claim 1, wherein each signal of the true signal of each moving dataset and the true signal of each stationary dataset comprises a single T2 value derived from the respective echo train from each of the datasets.

6. A non-transitory computer-readable storage medium comprising instructions for removing motion-induced noise that, when loaded into a processor, cause the processor to execute steps of:
   operating a nuclear magnetic resonance (NMR) tool in a wellbore to obtain a plurality of datasets, each dataset associated with a respective depth in a wellbore;
   generating corresponding echo trains from each dataset;
   identifying one or more datasets that were collected while a motion of the tool was below a predetermined threshold as stationary datasets, wherein datasets not identified as stationary are identified as moving datasets;
   building a statistical model of the echo trains based on the stationary datasets and the moving datasets;
   estimating a motion-induced noise component of the echo train using the statistical model and the stationary datasets;

calculating a distortion of the echo trains for each dataset of the plurality of datasets using a physical model of the tool within the wellbore;

estimating a true signal of each moving dataset based on the estimated motion-induced noise component and the respective calculated distortion;

estimating a true signal of each stationary dataset based on the respective calculated distortion; and combining the estimated true signals of the moving datasets and the stationary datasets to produce a superset of clean NMR data.

7. The memory of claim 6, wherein:

the dataset comprises one or more of a NMR magnetic field measurement, a depth parameter, and a motion parameter; and of identifying one or more stationary datasets comprises an evaluation of one or more of the depth parameter and the motion parameter.

8. The memory of claim 6, wherein estimating the motion-induced noise component of the echo train is based in part on a comparison of a portion of the echo trains of the moving datasets to a portion of the echo trains of the stationary datasets.

9. The memory of claim 6, further comprising a step of analyzing a formation surrounding the wellbore based in part on the superset of clean NMR data.

10. The memory of claim 6, wherein each signal of the true signal of each moving dataset and the true signal of each stationary dataset comprises a single T2 value derived from the respective echo train from each of the datasets.

11. A system for removing motion-induced noise, comprising a processor and a non-transitory computer-readable storage medium coupled to the processor and comprising instructions that, when loaded into the processor, cause the processor to execute steps of:

operating a nuclear magnetic resonance (NMR) tool in a wellbore to obtain a plurality of datasets, each dataset associated with a respective depth in the wellbore;

generating corresponding echo trains from each dataset;

identifying one or more datasets that were collected while a motion of the tool was below a predetermined threshold as stationary datasets, wherein datasets not identified as stationary are identified as moving datasets;

building a statistical model of the echo trains based on the stationary datasets and the moving datasets;

estimating a motion-induced noise component of the echo train using the statistical model and the stationary datasets;

calculating a distortion of the echo train for each dataset of the plurality of datasets using a physical model of the tool within the wellbore;

estimating a true signal of each moving dataset based on the estimated motion-induced noise component and the respective calculated distortion;

estimating a true signal of each stationary dataset based on the respective calculated distortion; and combining the estimated true signals of the moving datasets and the stationary datasets to produce a superset of clean NMR data.

12. The system of claim 11, wherein:

the dataset comprises one or more of a NMR magnetic field measurement, a depth parameter, and a motion parameter; and the instructions further cause the processor to execute identifying one or more stationary datasets comprises an evaluation of one or more of the depth parameter and the motion parameter.

13. The system of claim 11, wherein the instructions further cause the processor to execute estimating the motion-induced noise component of the echo train is based in part on a comparison of a portion of the echo trains of the moving datasets to a portion of the echo trains of the stationary datasets.

14. The system of claim 11, further comprising a step of analyzing a formation surrounding the wellbore based in part on the superset of clean NMR data.

15. The system of claim 11, wherein each signal of the true signal of each moving dataset and the true signal of each stationary dataset comprises a single T2 value derived from the respective echo train from each of the datasets.

* * * * *